United States Patent
Meier et al.

[11] 3,812,359
[45] May 21, 1974

[54] EXOATMOSPHERIC ENVIRONMENTAL TEST APPARATUS

[75] Inventors: Rudolf H. Meier, Santa Ana; Richard P. Day, San Juan Capistrano; Christopher J. C. Thompson, Costa Mesa, all of Calif.

[73] Assignee: McDonnell Douglas Corporation, Santa Monica, Calif.

[22] Filed: Aug. 24, 1972

[21] Appl. No.: 283,494

[52] U.S. Cl.............................. 250/347, 250/349
[51] Int. Cl............................................. G01t 1/16
[58] Field of Search............... 250/83.3 H, 347, 349

[56] References Cited
UNITED STATES PATENTS
3,600,581  8/1971  Menke........................ 250/83.3 H
3,453,431  7/1969  Lederhandler................ 250/83.3 H Primary Examiner—James W. Lawrence
Assistant Examiner—Davis L. Willis
Attorney, Agent, or Firm—D. N. Jeu; Walter J. Jason; Donald F. Royer

[57] ABSTRACT

Advanced sensor evaluation and test apparatus comprises a vacuum chamber with an inner cryoshroud, housing an on-axis optical parabolic collimator, a radiant energy source assembly having an output aperture located in the focal plane of the collimator, a calibration monitor consisting of a Cassegrainian type radiometer that occupies one portion of the collimated radiant energy beam and which forms an image of the source on a bolometer, and a pair of scanning mirrors directing energy from another portion of the collimated beam into the entrance aperture of the optical sensor under test. In addition, a background radiant energy generator can direct radiant energy simulating elevated radiation background to the sensor under test which, in turn, forms an enlarged image of the background source in its own detector plane. One version of the source assembly includes at least one blackbody radiation source of variable aperture and temperature with a chopper operating to provide modulated radiation which is projected into an integrating sphere coupled with a source projector. An adjustable dual reflector with one specularly and one diffusely reflecting surface is mounted inside the integrating sphere and can be rotated to predetermined orientations to function in either a specularly reflecting mode or diffusely reflecting mode. In a third mode of operation, the mirror is rotated into an inactive orientation in which it does not intercept the beam entering the integrating sphere. This is the integrating sphere mode of operation. Another version of the source assembly includes at least one blackbody radiation source providing radiation to an integrating sphere coupled with a radiation guide (pipe). The radiation guide can be either a single or dual guide (pipe) and is cooperatively structured to operate with selected transmission patterns (transparent portions) on a movable disc sector positioned at the end of the guide.

21 Claims, 12 Drawing Figures

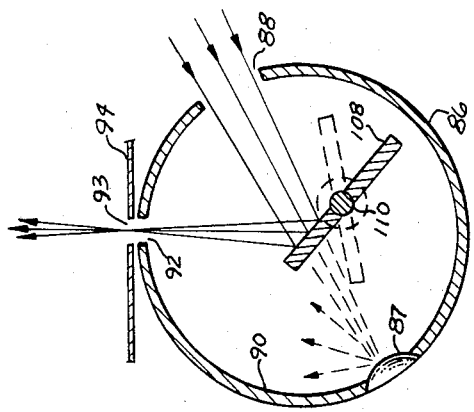
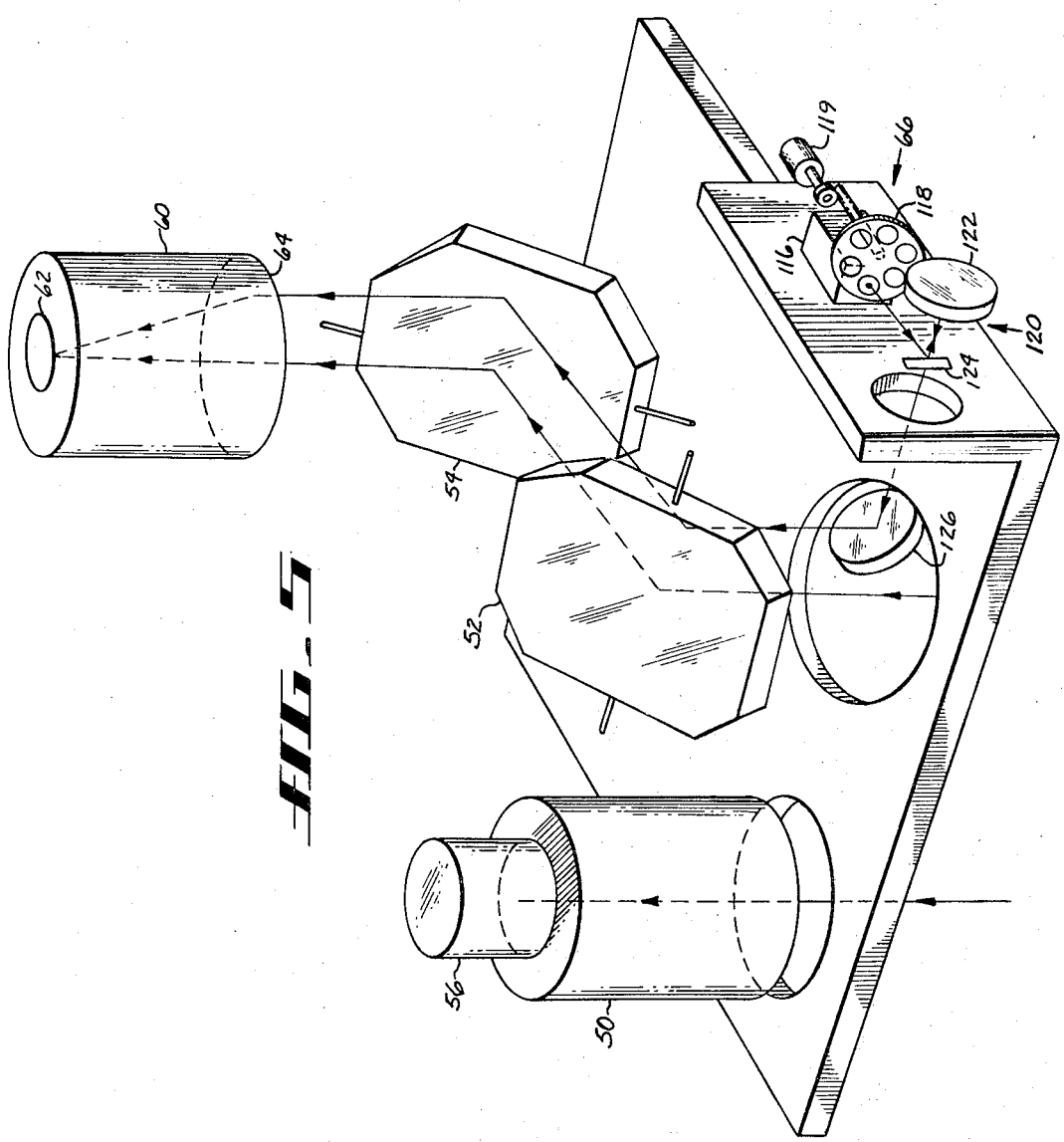

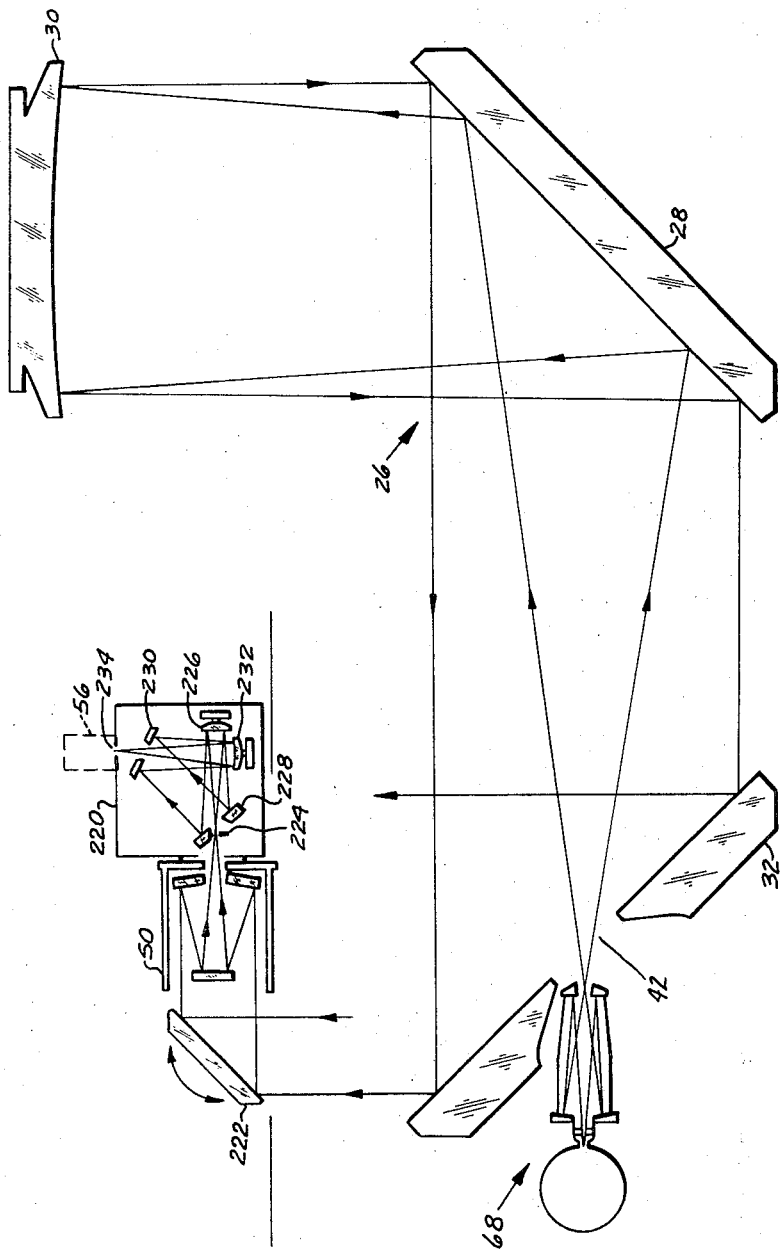

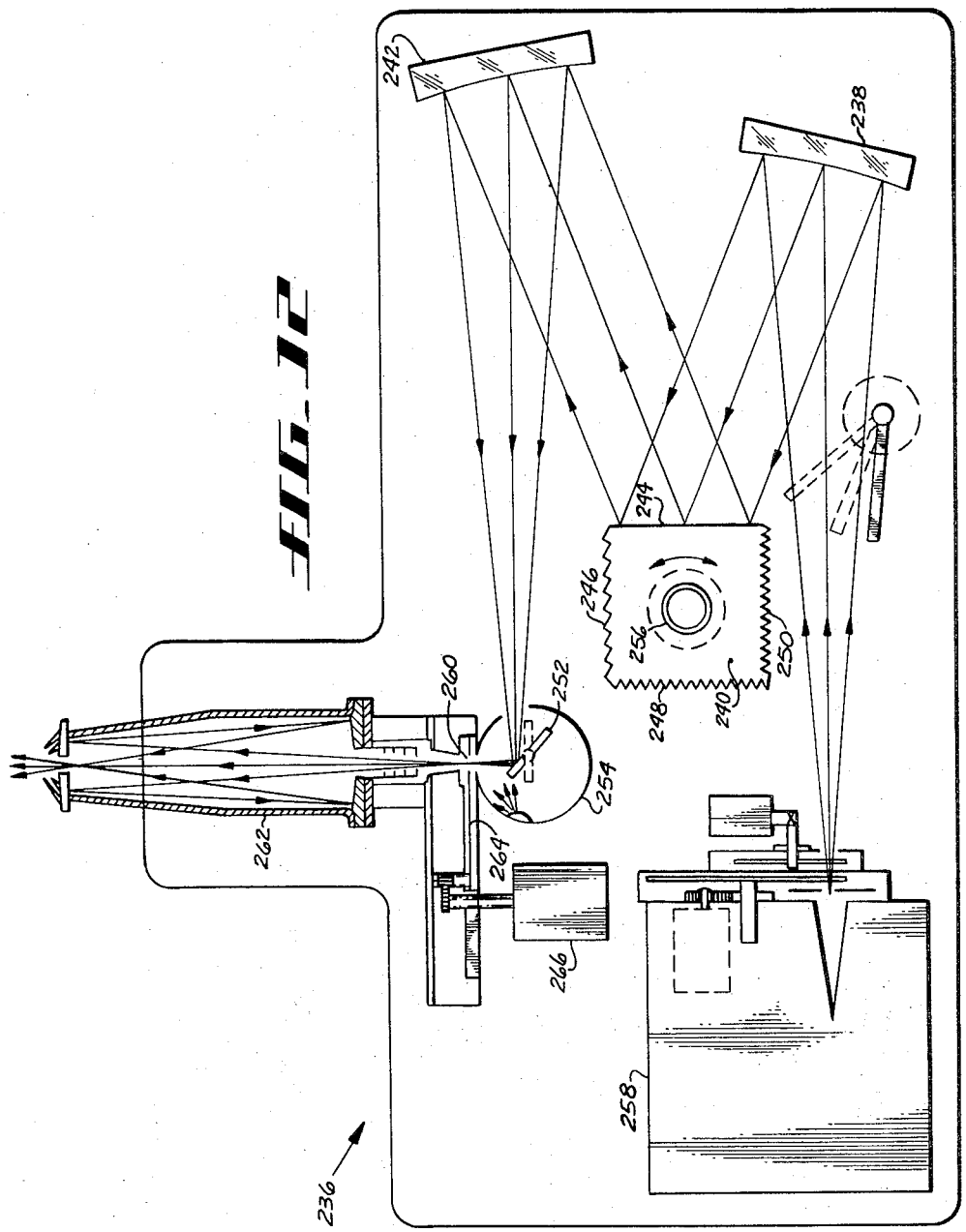

EXOATMOSPHERIC ENVIRONMENTAL TEST APPARATUS

BACKGROUND OF THE INVENTION

This invention relates generally to environmental test apparatus and, more particularly, to novel components and combinations of components in an advanced sensor evaluation and test apparatus for testing, under exoatmospheric conditions, components, subsystems and systems having the capability of generating and/or collecting and processing radiant energy.

With the advent of increased space flight and anticipated long range space missions in the foreseeable future, a greater need has developed for testing electro-optical (radiant energy) components, subsystems and systems under idealized testing conditions closely duplicating actual exoatmospheric environmental flight conditions. In order to measure certain test parameters of interest of, for example, a radiant energy sensor or of its detector-amplifier subsystem, a suitable source of modulated or constant level radiant energy is desirably provided to operate (excite) the detection means under appropriate environmental temperature and vacuum conditions. The source, moreover, must ordinarily appear to the detection means to be located at infinity, and may comprise single or multiple point sources and/or extended sources for both spatially static and dynamic target simulation. Of course, the noise equivalent flux density (NEFD) of the detection means must be established only by the inherent noise of the detector and its associated electronic circuitry. Absolute measurement and calibration of total and spectral properties of the detection means or other components are also required to provide adequate evaluation thereof.

SUMMARY OF THE INVENTION

Briefly, and in general terms, the invention includes a vacuum chamber with a vertical penetration, an inner cryoshroud, an on-axis folded parabola optical collimator contained in the cryoshroud, a radiant energy source assembly (of different selectable versions) having an output aperture located in the focal plane of the collimator, a calibration monitor consisting of a Cassegrainian type radiometer occupying one portion of the collimated beam and forming an image of the source on a bolometer, and a pair of scanning mirrors directing energy from another portion of the collimated beam into the entrance aperture of the sensor under test mounted in the chamber vertical penetration. Also, a background radiant energy generator can direct radiant energy simulating elevated background radiation into the entrance aperture of the sensor under test which, in turn, forms an enlarged image of the background source in its own detector plane.

More specifically, one version of the radiant energy source assembly includes a backbody radiation source of variable aperture and temperature with a chopper operating to provide modulated radiation which is projected into an integrating sphere coupled via a variable aperture with a source projector. An adjustable dual reflector with one specularly reflecting surface and one diffusely reflecting surface is mounted inside the integrating sphere and can be rotated to predetermined orientations to function in either a specularly reflecting mode or a diffusely reflecting mode. In a third mode of operation of this version of the source assembly, the mirror is rotated into an inactive orientation in which it does not intercept the beam entering the integrating sphere. This mode is called the integrating sphere mode of source operation. Another source assembly version includes a blackbody source providing radiant energy to an integrating sphere coupled with a radiation guide (pipe). The radiation guide can be either a single or dual guide and is cooperatively structured to operate with selected transmission patterns (transparent portions) on a movable disc sector positioned just before the end of the guide. Yet another source assembly version is a universal one which is generally similar to the first version described above but is implemented and arranged in a manner to be further capable of functioning electively as a monochromator type source assembly.

BRIEF DESCRIPTION OF THE DRAWINGS

The invention will be more fully understood, and other features and advantages thereof will become apparent, from the description given below of certain exemplary embodiments of the invention. This description of the exemplary embodiments of the invention is to be taken in conjunction with the accompanying drawings, in which:

FIG. 4 is an enlarged sectional view of the integrating sphere structure used in the radiant energy source assembly of FIG. 3;

FIG. 5 is a simplified perspective view of a pair of scanning mirrors directing radiant energy to a sensor and a background radiant energy generator cooperatively providing controlled background radiant energy over the entire area of the sensor's detector plane;

FIG. 11 is a simplified elevational view, somewhat schematically shown in section, of a spectrometer attachment for making spectral measurements; and FIG. 12 is a top plan view, shown somewhat diagrammatically in section, of a universal type source assembly.

DESCRIPTION OF THE PRESENT EMBODIMENTS

In the accompanying drawings and following description of certain exemplary embodiments of this invention, some specific dimensions, operating values and types of materials may be disclosed. Such dimensions, values and types of materials are, of course, given as examples only and are not intended to limit the scope of the invention in any manner.

Figure 1:
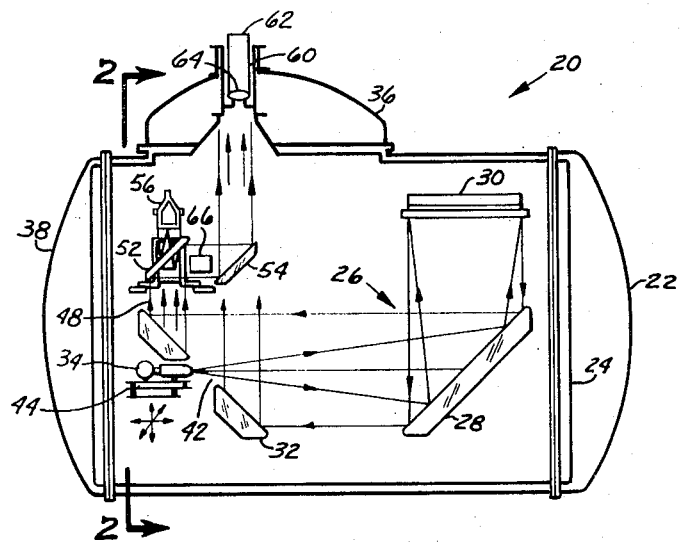
FIG. 1 is a simplified elevational view, shown somewhat diagrammatically in section, of an illustrative advanced sensor evaluation and test apparatus constructed in accordance with this invention.

FIG. 1 is a simplified elevational view, shown somewhat diagrammatically in section, of an illustrative advanced sensor and evaluation test apparatus 20 constructed in accordance with this invention. The test apparatus 20 basically includes a vacuum chamber 22, an inner cryoshroud 24, an on-axis optical collimator 26 comprising mirrors 28, 30 and 32 contained in the cryoshroud, a radiant energy source assembly 34, and optical and electronic instrumentation (not shown) required in calibration, test and evaluation of different sensors and various components of interest. Many of the elements of the test apparatus 20 are conventional and are only diagrammatically shown without detail. This permits greater clarity of illustration of the novel arrangement and combination of elements. Of course, individual novel elements are disclosed in adequate detail herein.

The vacuum chamber 22 is, for example, formed from a stainless steel horizontal cylinder approximately 8 feet in diameter by 14 feet long, with a vertical penetration 36 which is 78 inches in diameter. The vertical penetration 36 can be extended in height by stacking and securing spools (not shown) thereon to the desired height. Main access to the interior of the chamber 22 is through the cylinder end normally closed by removable cover 38, and through the vertical penetration 36. Additionally, eight portholes or penetrations (not shown) 11 inches in diameter and a number of smaller penetrations (also not shown) are distributed around the chamber wall. Vacuum levels of $10^{-9}$ torr or better are achieved with a conventional contamination-free pumping system (not shown) which includes a mechanical roughing pump, a sorption pump, an ion pump, a bulk titanium sublimation system and a turbo pump.

The cylindrical cryoshroud 24 is located inside the vacuum chamber 22 and is, for example, approximately 7 feet in diameter by 10 feet long. The cryoshroud 24 is preferably made from extruded aluminum High "E" Cryopanel (supplied by High Vacuum Equipment Corporation of Hingham, Massachusetts), and the interior surface is of a finned and serrated structure painted with a flat black which provides an emissivity close to unity. The cryoshroud 24 is cooled by dual one kilowatt-capacity, gaseous helium, closed cycle pumping systems (not shown), circulating the refrigerant through closely spaced passageways in the extruded panel structure. The cryoshroud 24 is cooled to a temperature of approximately 20°K, for example, thereby providing an extremely low background radiation environment.

Figure 2:
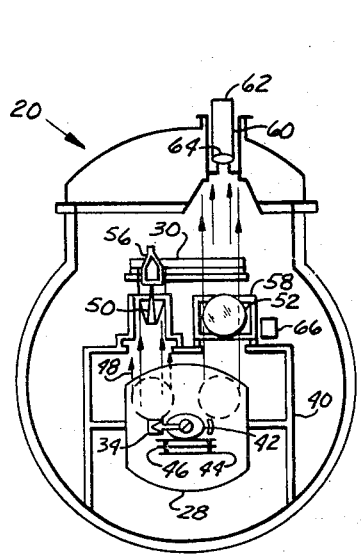
FIG. 2 is an end elevational view of the test apparatus as taken along the line 2—2 indicated in FIG. 1.

FIG. 2 is an end elevational view of the test apparatus 20 taken along the line 2—2 indicated in FIG. 1. The optical collimator 26 housed within the cryoshroud 24 is, for example, a 32-inch diameter, f/3.75 parabolic (mirror 30) on-axis collimation system. The three mirrors 28, 30 and 32 of this 119-inch focal length collimation system are integrally mounted in the positions illustrated on a framework 40 constructed from series 6061T6 aluminum tubing. The mirrors 28, 30 and 32 are, for example, fabricated from series 300 aluminum material, Kanigen coated, and figured to provide a diffraction limited system performance at all wavelengths of interest. To reduce cool-down time, the mirrors 28, 30 and 32 incorporate an independent thermal control system including cooling/heating coils (not shown) attached to their rear surfaces. The entire cryoshroud 24 chamber and its contents can reach a stable 20°K operating temperature in approximately 16 hours.

A radiant energy source or target simulating assembly 34 is located at the focal plane of collimator mirror 30 and radiates energy through central opening 42 of mirror 32 into the collimator 26. The source assembly 34 is mounted on a support structure 44 which is adjustable to position the source assembly in three dimensions about the focal plane of collimator mirror 30. In this instance, the support structure 44 is diagrammatically illustrated as, for example, a stack of three platforms 46 wherein the upper platform can be adjusted on rollers in a first horizontal dimension, the middle platform on rollers in a second horizontal dimension perpendicular to the first dimension, and the lower platform directly in a third dimension. Electric motors (not shown) can be used to adjust the three platforms, respectively.

The collimator 26 collimates and directs the radiant energy from the source assembly 34 in a 32-inch diameter beam as indicated by rays 48 partly to a Cassegrainian telescope 50 and partly to a pair of scanning mirrors 52 and 54. The telescope 50 collects and images that portion of the collimated radiant energy which enters its aperture to a bolometer 56 used for calibration purposes. The mirrors 52 and 54 are pivotably mounted on respective diameters in a beam deflector assembly 58 so that each can be deflected about a single axis which is orthogonal to the other axis, either in an oscillatory mode or in a static mode. The drive mechanisms (not shown) can be selectively energized, varied respectively in speed (frequency) and amplitude, or synchronously driven. The mirror 54 directs its reflected radiant energy into the entrance aperture of the sensor under test 60 which images the radiation source onto its detector plane 62 by representatively indicated optics 64. The sensor 60 comprises, for example, a Cassegrainian telescope and a detector or (more normally) an array of detectors located at its focal plane. The sensor 60 includes a cooling system (not shown) for maintaining its telescope and detector array at desired and predetermined temperatures. A background generator 66 for providing broadly superimposed radiation to the detector plane 62 is indicated only in block form in FIGS. 1 and 2 but will be shown and described in greater detail later.

Figure 3:
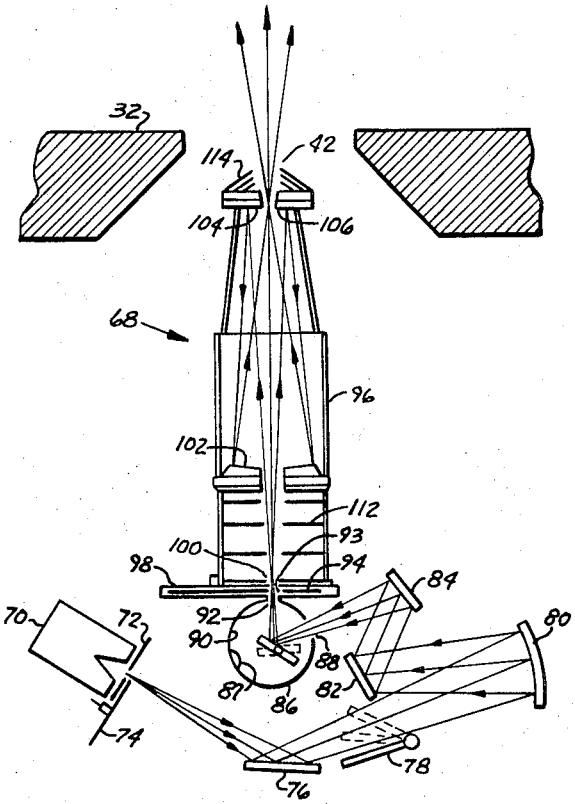
FIG. 3 is a top plan view, somewhat diagrammatically shown in section, of one version of a radiant energy source assembly used in the test apparatus depicted in FIGS. 1 and 2.

FIG. 3 is a top plan view, somewhat diagrammatically shown in section, of one version 68 of the radiant energy source assembly 34 which can be used in the test apparatus 20 of FIGS. 1 and 2. The source assembly version 68 includes a conventional adjustable temperature blackbody source 70 emitting radiation passing through a variable aperture in disc 72 and is normally chopped by a chopper 74. The disc 72 can have a number of differently sized and/or shaped apertures therein and can be remotely operated by a motor (not shown) to select any particular aperture. The chopper 74 can be a conventional chopper disc having one or more transparent sectors of suitable angular width and spacing, and driven by a variable speed motor (not shown). Since alternating current amplification is normally used with the detectors of sensor 60 (FIG. 1), if chopper 74 is not employed then at least one of the scanning mirrors 52 or 54 is oscillated to produce modulated output signals from the array detectors periodically excited by the oscillating (moving) image of the simulated source. The source radiation is reflected by a plano mirror 76 and may be attenuated by adjustable attenuator 78. The attenuator 78 is an opaque metallic plate which can be adjusted to different positions as indicated in broken lines to intercept a portion or all of the radiation beam. The beam is further reflected by an off-axis refocusing mirror 80 and plano mirrors 82 and 84 into an integrating sphere 86 through opening 88.

The integrating sphere 86 has a gold coated diffusely reflecting internal surface 90 and another opening 92 which represents a variable exit aperture for the radiation in conjunction with a variable aperture disc 94 located in its close proximity. Through this opening 92 the radiant energy enters the source projector 96. The disc 94 is rotatably mounted in housing 98 which has an opening 100 in registry with the opening 92 of integrating sphere 86 affixed to the housing. The disc 94 is similar to the disc 72 and can have a number of differently sized and/or shaped exit apertures 93 therein and can be remotely operated to select any particular exit aperture for the integrating sphere 86. The exit aperture 93 is placed at the back-focus of the source projector 96 which is, for example, a folded reflector telescope including a spherical converging mirror 102 and folding plano mirror 104 having a central aperture 106 located at the focal plane of the collimator mirror 30 (FIG. 1). The source projector 96 forms a demagnified image of the exit aperture 93 of the integrating sphere in the central aperture 106 of folding plano mirror 104. Since this demagnified image is located in the focal plane of the parabolic collimator 30, it represents the actual simulated source of the apparatus.

FIG. 4 is an enlarged central sectional view of the integrating sphere 86, clearly illustrating its internal structure. The integrating sphere 86 mounts a rotatable plano mirror 108 inside it on a shaft 110. The (metallic) mirror 108 has a specularly reflecting surface on one side and a diffusely reflecting surface on the opposite side. The shaft 110 extends outside of the sphere 86 and can be rotated by a motor (not shown) to adjust the mirror 108 to the positions indicated in solid and broken lines. In the solid line position of the mirror 108 as shown in FIG. 4, the specularly reflecting surface is normally used to direct the image formed by off-axis refocusing mirror 80 of the source aperture in disc 72 onto aperture 93 at the back-focus of the source projector 96. The source projector 96 then forms a demagnified secondary image of the source aperture at the focal plane of the collimator mirror 30 (FIG. 1). In the diffuse mode of operation, mirror 108 is rotated 180 degrees, such that its diffusely reflecting side comes into action. In this mode, depending on the degree of diffusion, the radiant flux which leaves the integrating sphere 86 within the useable acceptance angle of the source projector 96, is reduced by one to two orders of magnitude.

For the integrating sphere mode of operation, however, the mirror 108 is placed in the broken line position with its diffused reflecting surface facing the exit aperture 93. The mirror 108 is oriented approximately perpendicular generally to the axis of the source projector 96 (and the sphere opening 92) and does not act as a beam deflector, thus providing purely integrating sphere type output in such position. The sphere 86 functions more effectively by the addition of an internal convex diffused surface portion 87 which is positioned to reflect (scatter) the incoming radiation upwardly towards the opening 92. The diffused surface of mirror 108 facing the opening 92 further reflects any radiation back towards the opening 92. For a nominally 3-inch diameter sphere 86, for example, the convex portion 87 can be formed by inserting and welding a segment of a ¾ inch diameter sphere into a 5/16-inch hole in the sphere 86. The convex portion 87 is, of course, also diffusely gold coated. The mirror 108 can be, for example, approximately 1-inch by 1-inch.

In the integrating sphere mode of operation, the source output is again reduced by two to three orders of magnitude as compared to the diffuse reflection mode of operation. Also, in this mode, attenuator 78 (FIG. 3) can be applied for additional controlled radiant energy reduction by another two orders of magnitude. It is noted that the source projector 96 is carefully baffled by baffles 112 and 114 to obviate any problems due to scattered radiant energy. The major unique advantage of source assembly version 68 is that its radiant exitance can be varied by purely mechanical means over a wide dynamic range ($10^{10}$) without the application of filters or unduly small apertures and with no change of its spectral signature. The amount of radiant energy leaving opening 92 is simply controlled by the operational mode (position) of mirror 108, by aperture combinations and by the position of attenuator 78.

FIG. 5 is a simplified perspective view of the Cassegrainian type telescope 50 with bolometer 56, the pair of scanning mirrors 52 and 54, the sensor under test 60, and the background generator 66. The background generator 66 includes a blackbody source 116, a filter wheel assembly 118, a short focal length Cassegrainian type collimator 120 consisting of mirrors 122 and 124, and a plano reflector 126. The wheel assembly 118 can be selectively set or be rotated either in steps or continuously by motor 119. The wheel assembly 118 can thus adjust or vary the radiant energy in a predetermined manner by appropriate choice and sequence of filters mounted therein. The filters can, of course, be temporarily removed from the wheel assembly 118 which can then be rotated to serve as a form of chopper, or a conventional chopper (not shown) for modulation of the radiant energy emitted by the source 116 can be provided, for example, directly before the output of the source or directly after the wheel assembly. All of these elements of the background generator 66 can be suitably mounted to associated structure of the large collimator 26 (FIG. 1).

Plano reflector 126 deflects the collimated radiant energy from the background generator source 116 in a direction parallel to the collimated beam of the collimator 26 within the beam cross section (aperture) occupied by the pairs of scanning mirrors 52 and 54, such that the background radiant energy enters the aperture of the sensor under test 60 near its edge. Sensor 60 in turn forms with its own imaging optics 64 (FIG. 1) a much enlarged image of the aperture of the background source 116 which covers its own entire detector plane 62. The size of the image of the background source aperture as focused on the detector plane is equal to the background aperture size enlarged (magnified) generally in proportion to the ratio of the focal length of the sensor optics 64 to that of the collimator 120 (i.e., mirror 122 in FIG. 5). Since the enlarged background aperture image uniformly covers the entire detector array, any background image motion caused by one of the scanning mirrors 52 or 54 (when used) does not produce any significant modulated output signals from any of the array detectors due to such motion. Source 116 and the filters of the filter wheel assembly 118 are selected and controlled to have the desired background characteristics, which may be static or may vary in time. This background radiation is, of course, different and to be distinguished from the low background radiation environment due to the low temperature produced by the cryoshroud 24 (FIGS. 1 and 2).

Figure 6:
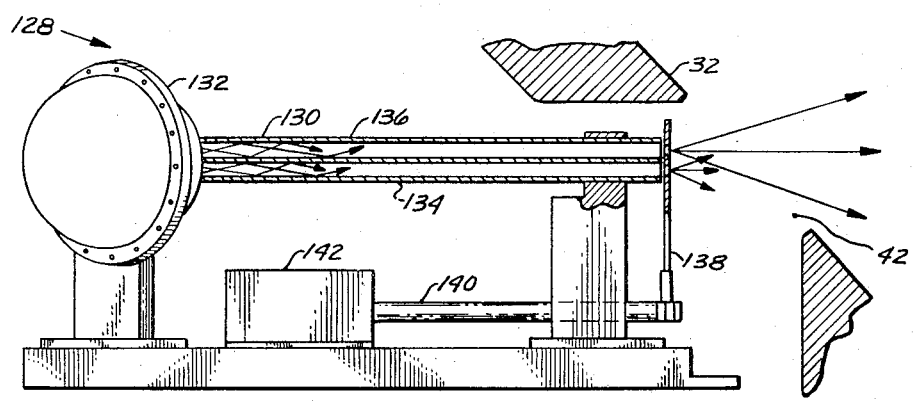
FIG. 6 is a side elevational view, shown partially in section, of another version of a radiant energy source assembly cooperatively structured to operate with a movable disc sector positioned just before the end of a dual radiation guide of the source assembly.

FIG. 6 is a side elevational view, shown partially in section, of another version 128 of the radiant energy source assembly 34 which can be used with the test apparatus 20 of FIGS. 1 and 2. It can be readily seen that the source assembly version 128 is generally similar to the version 68 (FIG. 3) except that a dual radiation guide 130 replaces the folded reflector telescope source projector 96 in directing spectrally undisturbed energy from an integrating sphere 132 to the focal plane of collimator mirror 30 (FIG. 1). The guide 130 is joined at one end to the integrating sphere 132 at which two adjacent output apertures or a suitably shaped sphere aperture similar to opening 92 (FIG. 4) may be located. The guide 130 includes a cylindrical lower guide member 134 and a contiguous cylindrical upper guide member 136.

A dual variable aperture mask 138 is positioned just before the other end of the guide 130 perpendicularly to the axes of the guide members 134 and 136. The mask 138 is of the form of a thin disc sector having its lower apex portion mounted to the end of the output shaft 140 of an electric motor 142. The motor 142 is regularly reversed in direction by using any suitable control means to oscillate the mask 138 in traveling between its angular width limits. Power to the reversible motor 142 can, for example, be periodically switched between forward and reverse terminals (windings) by an electrical, electronic or mechanical switching means.

Figure 7:
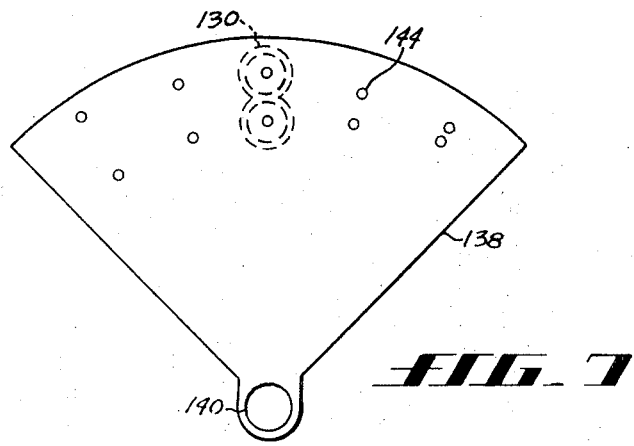
FIG. 7 is a front elevational view of the movable disc sector shown in FIG. 6.

FIG. 7 is a front elevational view of the movable disc sector mask 138. Five pairs of apertures 144 are provided in the mask 138, for example. The pairs of apertures 144 are equiangularly spaced from each other, and are progressively spaced closer together as illustrated. The motor 142 (FIG. 6) can be suitably controlled to rotate the mask 138 either continuously or in discrete steps in a counterclockwise direction so that the radiant energy from the dual radiation guide 130 produces a pair of small (point) sources from the pairs of apertures 144, which are progressively moved radially closer together. This, of course, provides a measure of the resolving ability of the sensor 60 (FIG. 3) under test. In this instance, only one of the scanning mirrors 52 or 54 is used to provide a radial scan (vertical in FIG. 7) at a reciprocatory rate which is sufficiently high relative to the rotation rate of mask 138 to produce an adequate exposure of the sensor 60 from both apertures of each pair of apertures 144. The detector array of sensor 60 includes, for example, 8 (or 16) detectors arranged in 2 (or 4) rows of 4 detectors each in the detector plane 62. The detectors of each row can be staggered with respect to those of an adjacent row, and scanning is normally perpendicular to the rows.

Figure 8:
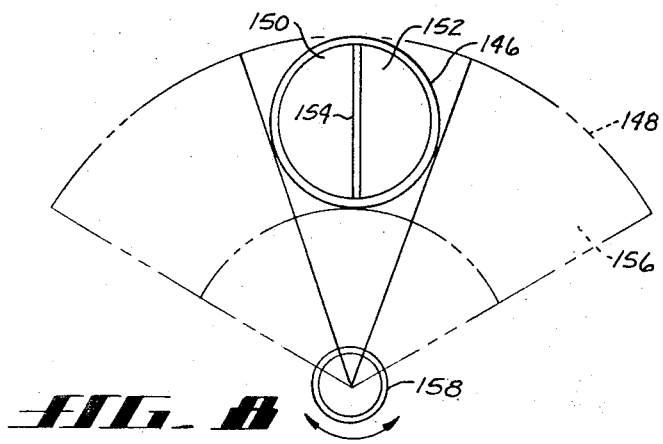
FIG. 8 is a front elevational view of the end of a single radiation guide which is cooperatively structured to operate with the transmission pattern (transparent portions) of a movable disc sector indicated in phantom lines before the end of the guide.

FIG. 8 is a front elevational view of the end of a single radiation guide 146 which is cooperatively structured to operate with the transmission pattern (transparent portions) of a movable disc sector mask 148 indicated in phantom lines before the end of the guide. The guide 146 replaces the dual radiation guide 130 (FIG. 6) but is otherwise similar thereto. The normally open end of the guide 146 is closed by two semicircular cover discs 150 and 152, leaving a narrow and vertical diametrical slit 154 between the two cover discs. Radiant energy will, therefore, be emitted from the stationary slit 154 to the corresponding, radially outer, portion 156 of the adjacent movable mask 148 which can be suitably rotated or oscillated on motor drive shaft 158.

Figure 9:
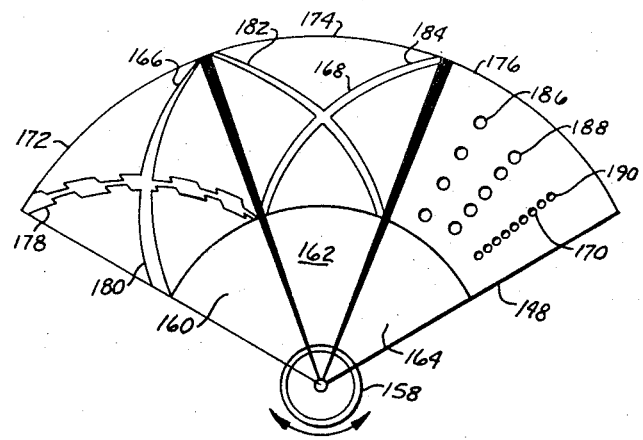
FIG. 9 is a front elevational view of the movable disc sector indicated in phantom lines in FIG. 8.

FIG. 9 is a front elevational view of the movable disc sector mask 148 which was indicated in phantom lines in FIG. 8. This mask 148 includes, for example, three wedge sections 160, 162 and 164 having different transmission patterns (transparent portions) 166, 168, and 170 provided respectively in the radially outer portions 172, 174 and 176 thereof. The patterns 166, 168 and 170 are such that they function cooperatively with the shape and dimensions of the stationary slit 152 (FIG. 8) provided at the end of the single radiation guide 146. The mask 148 can be rotatably oscillated in a continuous motion by motor drive shaft 158 between extremes of the sector mask or between extremes of any selected one of the wedge sections 160, 162 and 164. Of course, the mask 148 can also be rotatably driven in discrete steps rather than in a continuous motion if desired. This may be especially desirable, for example, with the pattern 170. Of course, with the sensor 60, only one of the scanning mirrors 52 or 54 is driven to provide a radial scan (vertically along the stationary slit 152 in FIG. 8) at a reciprocatory rate which is high relative to the rotation rate of mask 148.

In the pattern 166, a curved transparent strip 178 intersects with another curved transparent strip 180. The strip 178 extends from the upper left corner of the radially outer portion 172 of mask section 160 to the lower right corner of such portion and is of regularly alternating, equal length, strip widths. The strip 178 is curved such that a linear radial (vertical) travel is obtained with uniform (constant) speed rotation of the mask 148 and a regularly pulsating square wave (or sine wave with suitable variation of strip widths) source output is provided. The strip 180 extends from the lower left corner of portion 172 to the upper right corner thereof and decreases progressively in strip width. The strip 180 is also curved such that a linear radial (vertical) travel is obtained with uniform (constant) speed rotation of the mask 148 and a regularly decreasing (size) source output is provided. Thus, a variable pulsating size source and a decreasing size source which progressively approach each other and then draw apart can be provided by the pattern 166.

In the pattern 168, two curved intersecting transparent strips 182 and 184 are provided in the radially outer portion 174 of mask section 162. The strips 182 and 184 are of similar and constant widths, and are each curved such that a linear radial (vertical) travel is obtained with uniform (constant) speed rotation of the mask 148. Thus, two sources of similar size and which progressively approach each other and then draw apart can be provided by the pattern 168. The pattern 170, however, includes three radial columns 186, 188 and 190 of similarly sized apertures. The apertures in column 186 are more distantly separated than those in column 190. In this instance, the mask 148 is preferably driven in discrete steps from one column of apertures to the next so that each of the aperture columns 186, 188 and 190 will be scanned in a stationary condition. Thus, resolution measurements can be made with pattern 168 simulating two dynamically moving target sources, and with pattern 170 simulating spatially static target sources.

Figure 10:
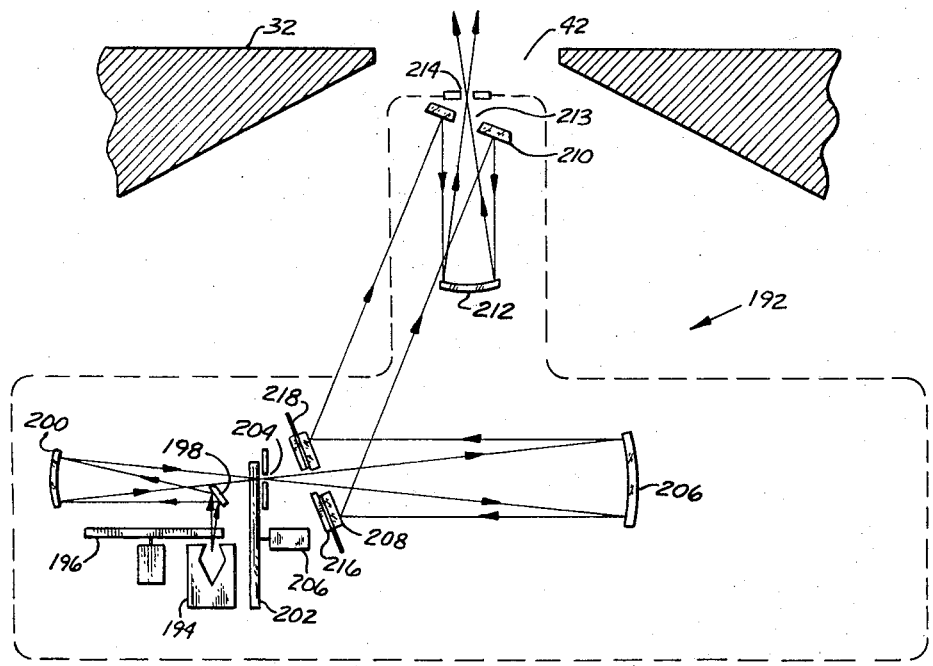
FIG. 10 is a top plan view, shown somewhat diagrammatically in section, of a schematic layout of a monochromator type source assembly.

FIG. 10 is a top plan view, schematically shown, of a monochromator type of source assembly 192 which replaces the source assembly version 68 (FIG. 3) entirely when used. The monochromator source assembly 192 is capable of projecting monochromatic radiant energy, variable over a wide wavelength range, into the collimator 26 (FIG. 1) of the apparatus 20. A blackbody radiation source 194 emits radiation which can be chopped by chopper 196 and reflected by plano mirror 198 to condenser mirror 200 that focuses the radiation through filter wheel 202 onto entrance aperture 204. The filter wheel 202 includes different optical filters for blocking certain orders of radiation and can be adjusted by motor 206 to position a selected filter before the entrance aperture 204.

The radiant energy passing through the entrance aperture 204 is collimated and reflected by a spherical mirror 206 to diffraction grating 208 which, in turn, diffracts and reflects the radiation to plano mirror 210. The plano mirror 210 directs the diffracted radiation to spherical mirror 212 which focuses it through central opening 213 of mirror 210 onto exit aperture 214 located at the prime focus of the parabolic mirror 30 (FIGS. 1 and 2) of collimator 26. A plano mirror 216 is mounted to the backing of the grating 208. By rotating the grating 208 on its axis 218 over 180°, the radiant energy from the source 194 can be transmitted through the source assembly 192 without diffraction by the grating 208. This provides a measure of the total radiant energy involved.

FIG. 11 is a diagrammatic elevational view, shown largely in section, of an all-reflective optical system for making spectral measurements of sources and materials with the use of a grating spectrometer 220 located in a suitable portion of the collimated beam 48 (FIG. 2), utilizing the Cassegrainian type radiometer telescope 50 as the focusing device (collector) and the bolometer 56 of the calibration monitor as the detector. The source assembly version 68 (FIG. 3) is illustratively used with the collimator 26. A scanning mirror 222 is interposed between the collimator 26 output and the telescope 50 which has been mounted in a position to collect the radiation reflected by the scanning mirror. Energy is coupled into the spectrometer 220 by the telescope 50 and the output of the spectrometer is directed to the bolometer 56.

The spectrometer 220 is characterized by an on-axis optical system that is advantageous in assuring ease of alignment, reliability of operation and high image quality. Spectral resolution attainable with the system is high. The entrance aperture 224 to the spectrometer 220 is located at the focal point of the telescope 50. Mirror 226 collimates and reflects the energy collected by the telescope 50 to grating 228 which, in turn, reflects the diffracted energy to mirrors 230 and 232, the latter focusing the energy on exit aperture 234 and bolometer 56. A liquid helium cooled, gallium doped, germanium bolometer detector providing a spectrally flat, high sensitivity, response can be used, for example.

FIG. 12 is a top plan view, schematically shown largely in section, of a universal version of source assembly 236 which novelly combines the monochromator type of source assembly 192 (FIG. 10) integrally into or with the source assembly version 68 (FIG. 3). It can be readily seen from a comparison of the versions 68 and 236 that essentially mirrors 76, 80, 82 and 84 of FIG. 3 have been replaced by spherical mirror 238, reflector cube 240 and spherical mirror 242 of FIG. 12. The spherical mirrors 238 and 242 are similar, and the metallic cube 240 includes a plano specularly reflecting mirror 244 and three different diffraction gratings 246, 248 and 250, for example. The gratings 246, 248 and 250 are normally used with reflector element 252 in the integrating sphere 254 oriented in the specularly reflecting mode.

The reflector cube 240 can be rotatably adjusted by any suitable means such as a motor (not shown) coupled to the mounting shaft 256 of the cube to place a selected one of the mirror 244 or gratings 246, 248 and 250 in the reflecting position shown for mirror 244 in FIG. 12. A polyhedron of more than six faces can, of course, also be used. The mirror 238 collimates the radiant energy from blackbody source 258 to the mirror or grating (of cube 240) placed in the reflecting position, and the mirror 242 focuses the radiant energy reflected therefrom after further reflection by the reflector element 252 in integrating sphere 254 onto its exit aperture 260 placed at the back-focus of source projector 262. Disc 264 includes a number of different sized exit apertures 260 arcuately spaced near its periphery and can be adjusted by motor 266 to position a selected size exit aperture at the back-focus of projector 262.

By using blackbody sources and detectors which are secondary standards with respect to National Bureau of Standards calibrations, absolute spectral measurements can be made to their assigned degree of accuracy. Thus, determinations of spectral or total irradiance, emittance, responsivity, noise figure, transmittance, reflectance and emissivity can be made respectively on unknown sources detectors, sensors, filters and optical elements. Further, in addition to standard responsivity and noise measurements of space optical systems, other specialized measurements can be made with the advanced sensor evaluation and test apparatus. These include the determination of baffle efficiencies, cryogen subsystem efficiencies, the evaluation of optical surfaces by interferometric and/or holographic methods, the transient response of detector-amplifier subsystems and cross-talk measurements with respect to detector arrays.

It is to be understood that the exemplary embodiments of this invention as described above and shown in the accompanying drawings are merely illustrative of, and not restrictive on, the broad invention and that the invention is not to be limited to the exact details of construction shown and described, for obvious modifications may occur to persons skilled in the art.

What is claimed is:

1. In an advanced sensor evaluation and test facility, exoatmospheric environmental test apparatus comprising:
   a vacuum chamber for providing and maintaining a predetermined vacuum condition therein;
   a cryoshroud within said vacuum chamber for providing and maintaining a predetermined temperature therein;
   an optical collimator contained in said cryoshroud;
   a radiant energy source assembly for directing radiant energy into said collimator;
   a first radiant energy collection device for directing and focusing radiant energy from a first portion of said collimator onto a first detector means; and
   a second radiant energy collection device for directing and focusing radiant energy from a second portion of said collimator onto a second detector means, and wherein said collimator includes an on-axis collimating system comprising a first mirror having a plano reflecting surface, a second mirror having a parabolic reflecting surface, and a third mirror having a plano reflecting surface and a generally central opening therethrough, said radiant energy source assembly directing its output energy through said central opening of said third mirror to said reflecting surface of said first mirror which reflects said output energy to said parabolic reflecting surface that reflects collimated radiant energy back to said reflecting surface of said first mirror which reflects said collimated radiant energy to said reflecting surface of said third mirror that then reflects said collimated radiant energy to said first and second collection devices and their respective detector means.

2. Apparatus as defined in claim 1 further comprising fourth and fifth mirrors having plano reflecting surfaces and rotatably mounted between said third mirror and said second collection device, and means for rotatably oscillating said fourth and fifth mirrors on their respective axes whereby mutually orthogonal scanning motions of said second portion of the collimated beam can be provided by said fourth and fifth mirrors.

3. Apparatus as defined in claim 2 wherein said source assembly includes a source of radiant energy, an integrating sphere having an input aperture and an output aperture, means for directing the radiant energy from said source into said sphere through said input aperture, and a radiation guide coupled to said output aperture for directing integrated radiant energy from said sphere into said collimator, said radiation guide having a narrow slit opening at its end for emitting said integrated radiant energy.

4. Apparatus as defined in claim 3 further comprising a movable disc mask positioned with its plane perpendicularly to the axis of said radiation guide before the end thereof, said mask having a transmission pattern thereon to function cooperatively with the geometry of said slit, and means for rotatably driving said mask in a predetermined motion whereby a selected source configuration and behavior are produced and provided to said collimator.

5. Apparatus as defined in claim 4 wherein said transmission pattern extends over a relatively wide span of a portion of said mask, and said fourth mirror is rotatably oscillated at a predetermined rate to scan over the span of said pattern.

6. Apparatus as defined in claim 5 wherein said transmission pattern includes first and second transparent strips of predetermined configurations, said strips extending radially outward and circumferentially in opposite directions across a portion of said mask to intersect at a common point whereby a pair of relatively small radiant energy sources which progressively approach each other and then draw apart are provided from said first and second strips as said mask is rotatably driven.

7. Apparatus as defined in claim 2 wherein said source assembly includes a source of radiant energy, an intergrating sphere having an input aperture and two adjacent output apertures, means for directing the radiant energy from said source into said sphere through said input aperture, and a dual radiation guide having two longitudinally contiguous guide portions, said contiguous guide portions being correspondingly coupled respectively to said output apertures for directing integrated radiant energy from said sphere into said collimator, said dual radiation guide having closely adjacent circular openings at its non-coupled end for emitting said integrated radiant energy.

8. Apparatus as defined in claim 7 further comprising a movable disc mask positioned with its plane perpendicular to the axis of said dual radiation guide before the end thereof, said mask having a transmission aperture pattern thereon to function cooperatively with said circular openings, and means for rotatably driving said mask in a predetermined motion whereby a selected source configuration and behavior are produced and provided to said collimator.

9. Apparatus as defined in claim 8 wherein said transmission aperture pattern includes a plurality of pairs of apertures, the apertures of each pair being radially aligned and progressively spaced closer together, and said pairs of radially aligned apertures being circumferentially spaced angularly from each other whereby a pair of relatively small radiant energy sources which are progressively moved radially closer together are provided from said pairs of apertures as said mask is rotatably driven.

10. In an advanced sensor evaluation and test facility, exoatmospheric environmental test apparatus comprising:
   a vacuum chamber for providing and maintaining a predetermined vacuum condition therein;
   a cryoshroud within said vacuum chamber for providing and maintaining a predetermined temperature therein;
   an optical collimator ontained in said cryoshroud;
   a radiant energy source assembly for directing radiant energy into said collimator; and
   a radiant energy collection device for directing and focusing radiant energy from said collimator onto a detector means, and wherein said collimator includes an on-axis collimating system comprising a first mirror having a plano reflecting surface, a second mirror having a parabolic reflecting surface, and a third mirror having a plano reflecting surface and a generally central opening therethrough, said radiant energy source assembly directing its output energy through said central opening of said third mirror to said reflecting surface of said first mirror which reflects said output energy to said parabolic reflecting surface that reflects collimated radiant energy back to said reflecting surface of said first mirror which reflects said collimated radiant energy to said reflecting surface of said third mirror that then reflects said collimated radiant energy to said collection device and its detector means.

11. Apparatus as defined in claim 10 further comprising fourth and fifth mirrors having plano reflecting surfaces and rotatably mounted between said third mirror and said collection device, and means for rotatably oscillating said fourth and fifth mirrors on their respective axes whereby mutually orthogonal scanning motions of said collimated beam can be provided by said fourth and fifth mirrors.

12. Apparatus as defined in claim 11 wherein said source assembly includes a source of radiant energy, an integrating sphere having an input aperture and an output aperture, means for directing the radiant energy from said source into said sphere through said input aperture, and a radiation guide coupled to said output aperture for directing integrated radiant energy from said sphere into said collimator, said radiation guide having a narrow slit opening at its end for emitting said integrating radiant energy.

13. Apparatus as defined in claim 12 further comprising a movable disc mask positioned with its plane perpendicularly to the axis of said radiation guide before the end thereof, said mask having a transmission pattern thereon to function cooperatively with the geometry of said slit, and means for rotatably driving said mask in a predetermined motion whereby a selected source configuration and behavior are produced and provided to said collimator.

14. Apparatus as defined in claim 13 wherein said transmission pattern extends over a relatively wide span of a portion of said mask, and said fourth mirror is rotatably oscillated at a predetermined rate to scan over the span of said pattern.

15. Apparatus as defined in claim 14 wherein said transmission pattern includes first and second transparent strips of predetermined configurations, said strips extending radially outward and circumferentially in opposite directions across a portion of said mask to intersect at a common point whereby a pair of relatively small radiant energy sources which progressively approach each other and then draw apart are provided from said first and second strips as said mask is rotatably driven.

16. Apparatus as defined in claim 11 wherein said source assembly includes a source of radiant energy, an integrating sphere having an input aperture and two adjacent output apertures, means for directing the radiant energy from said source into said sphere through said input aperture, and a dual radiation guide having two longitudinally contiguous guide portions, said contiguous guide portions being correspondingly coupled respectively to said output apertures for directing integrated radiant energy from said sphere into said collimator, said dual radiation guide having closely adjacent circular openings at its non-coupled end for emitting said integrated radiant energy.

17. Apparatus as defined in claim 16 further comprising a movable disc mask positioned with its plane perpendicularly to the axis of said dual radiation guide before the end thereof, said mask having a transmission aperture pattern thereon to function cooperatively with said circular openings, and means for rotatably driving said mask in a predetermined motion whereby a selected source configuration and behavior are produced and provided to said collimator.

18. Apparatus as defined in claim 17 wherein said transmission aperture pattern includes a plurality of pairs of apertures, the apertures of each pair being radially aligned and progressively spaced closer together, and said pairs of radially aligned apertures being circumferentially spaced angularly from each other whereby a pair of relatively small radiant energy sources which are progressively moved radially closer together are provided from said pairs of apertures as said mask is rotatably driven.

19. For use in exoatmospheric environmental test apparatus including a source of radiant energy, an integrating sphere having an input aperture and at least one output aperture, means for directing the radiant energy from said source into said sphere through said input aperture, and radiation guide means coupled to said output aperture for directing integrated radiant energy from said sphere, said radiation guide means having at least one opening of predetermined geometry at its end for emitting said integrated radiant energy, means comprising:

a movable disc mask positioned with its plane perpendicularly to the axis of said radiation guide means before the end thereof, said mask having a transmission pattern thereon to function cooperatively with the geometry of said opening; and means for rotatably driving said mask in a predetermined motion whereby a selected source configuration and behavior are produced.

20. Apparatus as defined in claim 19 wherein said sphere has one output aperture, and said radiation guide means includes a single radiation guide coupled to said one output aperture and having a narrow slit opening at its end for emitting said integrated radiant energy, and wherein said transmission pattern of said mask includes first and second transparent strips of predetermined configurations, said strips extending radially outward and circumferentially in opposite directions across a portion of said mask to intersect at a common point whereby a pair of relatively small radiant energy sources which progressively approach each other and then draw apart are provided from said first and second strips as said mask is rotatably driven.

21. Apparatus as defined in claim 19 wherein said sphere has two adjacent output apertures, and said radiation guide means includes a dual radiation guide having two longitudinally contiguous guide portions, said contiguous guide portions being correspondingly coupled respectively to said output apertures and having closely adjacent circular openings at its non-coupled end for emitting said integrated radiant energy, and wherein said transmission pattern of said mask includes a plurality of pairs of apertures, the apertures of each pair being radially aligned and progressively spaced closer together, and said pairs of radially aligned apertures being circumferentially spaced angularly from each other whereby a pair of relatively small radiant energy sources which are progressively moved radially closer together are provided from said pairs of apertures as said mask is rotatably driven.

* * * * *